(12) United States Patent
Fuhrmann et al.

(10) Patent No.: US 6,487,397 B2
(45) Date of Patent: *Nov. 26, 2002

(54) ELECTRONIC DEVICE WITH HOUSING SUPPLEMENT

(75) Inventors: Thomas Fuhrmann, Dulmen/Buldern (DE); Annett Wilke, Bochum (DE); Dirk Umbach, Hattingen (DE)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/870,173

(22) Filed: May 30, 2001

(65) Prior Publication Data

US 2001/0024947 A1 Sep. 27, 2001

Related U.S. Application Data

(63) Continuation of application No. 08/800,591, filed on Feb. 18, 1997.

(30) Foreign Application Priority Data

Feb. 28, 1996 (EP) .............................................. 96102988

(51) Int. Cl.[7] ................................................ H04B 1/38
(52) U.S. Cl. ........................ 455/90; 455/128; 455/348; 379/433.11
(58) Field of Search .......................... 455/90, 575, 351, 455/117, 217, 347–349, 128, 550; 379/433.11, 433.01

(56) References Cited

U.S. PATENT DOCUMENTS

| | | | |
|---|---|---|---|
| 3,838,229 A | 9/1974 | Morrell et al. | 179/100 D |
| 4,142,312 A | 3/1979 | Stokes | 379/368 |
| 4,179,591 A | 12/1979 | Becker | 179/179 |
| 4,291,202 A | 9/1981 | Adams et al. | 179/103 |
| 4,292,481 A | 9/1981 | Barnes et al. | 179/178 |
| D262,214 S | 12/1981 | Obst | D14/251 |
| 4,433,216 A | 2/1984 | Isaacs | 179/178 |
| 4,621,373 A | 11/1986 | Hodsdon | 455/128 |
| 4,679,231 A | 7/1987 | Reichie | 379/429 |
| 4,945,633 A | 8/1990 | Hakanen et al. | 29/825 |
| 5,036,432 A | 7/1991 | Uronen et al. | 361/422 |
| 5,045,973 A | 9/1991 | Saarela et al. | 361/395 |
| 5,096,317 A | 3/1992 | Phillippe | 400/714 |
| 5,134,654 A | 7/1992 | McGough | 179/179 |
| 5,140,632 A | 8/1992 | Anten | 379/447 |
| 5,146,615 A | 9/1992 | Hodsdon et al. | 455/90 |
| 5,175,873 A | 12/1992 | Goldenberg et al. | 455/128 |

(List continued on next page.)

FOREIGN PATENT DOCUMENTS

| | | |
|---|---|---|
| DE | 94 03 890 U1 | 8/1995 |
| EP | 0 351 863 A2 | 1/1990 |
| GB | 2293517 | 3/1996 |
| GB | 2305810 A | 4/1997 |
| WO | WO 93/17513 | 9/1993 |

OTHER PUBLICATIONS

Patent Abstracts of Japan, Publication No.: 59126354; Publication Date: Jul. 20, 1984; Fujitsu Ltd.
European Search Report dated Sep. 14, 2001.
Karma Chameleon, What Mobile, Sep. 2000, pp. 30–32.
Two page advertisement, Nokia Mobile Phones, 1995.
European Search Report dated Jul. 23, 1996.

Primary Examiner—Nguyen T. Vo
(74) Attorney, Agent, or Firm—Perman & Green; Steven A. Shaw

(57) ABSTRACT

The invention relates to an electronic device having a housing, which has a housing wall with openings for control elements and/or display elements. An external wall element, which at least partially covers the housing wall, is detachably connected to the housing. The external wall element has openings which are aligned with the openings in the housing wall. As a result, by using different external wall elements the external appearance of the electronic device can be easily modified.

8 Claims, 3 Drawing Sheets

U.S. PATENT DOCUMENTS

| | | | |
|---|---|---|---|
| 5,233,506 A | 8/1993 | Semenik et al. | 361/814 |
| 5,235,636 A | 8/1993 | Takagi et al. | 379/368 |
| 5,276,588 A | 1/1994 | Repplinger et al. | 361/736 |
| 5,357,570 A | 10/1994 | Tomura et al. | 379/433 |
| 5,509,057 A | 4/1996 | Anello et al. | 379/145 |
| 5,577,267 A | 11/1996 | Jungles-Butler et al. | 455/128 |
| 5,596,487 A | 1/1997 | Castaneda et al. | 361/814 |
| D385,876 S | 11/1997 | Parl | D14/138 |
| D385,887 S | 11/1997 | Park | D14/138 |
| 5,733,023 A | 3/1998 | Lee | 312/208.3 |
| 5,848,152 A | 12/1998 | Slipy et al. | 379/433 |
| 5,960,332 A | 9/1999 | Michalizik | 455/90 |
| 5,982,881 A | 11/1999 | Mischenko | 379/433 |

ELECTRONIC DEVICE WITH HOUSING SUPPLEMENT

CROSS REFERENCE TO RELATED APPLICATION

This application is a continuation of U.S. application Ser. No. 08/800,591, filed Feb. 18, 1997.

BACKGROUND OF THE INVENTION

The invention relates to an electronic device having a housing which has a housing wall with openings for control and/or display elements.

An electronic device of this kind may be for example a telephone, a cordless phone or mobile phone, a pocket calculator, a television set, a radio receiver or for example another electronic domestic appliance which, as a rule, is used by private individuals. If, for personal reasons or because of predetermined requirements, the external appearance of such an electronic device, for example the shape of the housing or its colour, is to be modified, as a rule this must be carried out by a specialist since during such an operation the electronic components present in the housing of the electronic device are usually exposed. Modification of the appearance of the housing of the electronic device is thus laborious, time-consuming and expensive and, moreover, can as a rule only rarely be carried out by private individuals.

SUMMARY OF THE INVENTION

In accordance with the invention there is provided an electronic device having a housing which has a housing wall with openings for control elements and/or display elements, characterized by attachment means for detachably connecting to the housing an external wall element which at least partially covers the housing wall, the external wall element having openings which are aligned with the openings in the housing wall. Advantageous refinements of the invention can be found in the subclaims.

An electronic device in accordance with the invention allows the external appearance of the housing to be modified rapidly and easily even by non-professionals.

With the electronic device according to the invention, a user thus has the possibility of modifying the appearance or design of the housing in an extremely short time and without any difficulty by selecting and fitting on an appropriate external wall element. The user can thus more or less change the housing according to his wishes if external elements with different shapes and colours are available to him for this purpose. Even external wall elements made of different materials are possible.

When the housing wall provided with openings is covered by the external wall element, the openings provided in the housing wall and in the external wall element are aligned with one another so that for example the push-button keys which project through the openings can continue to be used even after the external wall element is fitted on to the housing wall or display elements which are inserted into the openings can continue to be read. This also applies to microphones or loudspeakers inserted into opening, for example in the case of cordless telephones.

With the electronic device according to the invention, the electronics provided in the device are always protected against access by the customer when the external appearance of the housing is modified. Therefore, if one external wall element is to be replaced by another in order to give the electronic device a new design, there is no risk of the electronics present in the housing being damaged when the external wall elements are interchanged or of the user being subjected to danger by the electronics present inside the housing. In this respect, the external wall elements could even be interchanged when an electronic device is operating.

According to an advantageous refinement of the invention, the external wall element can engage, at least partially, over further housing walls of the housing so that the design of the housing can be modified to an even greater extent or adapted to the wishes of the user to an even greater degree.

At the same time, the profile of the external wall element can follow the profile of the housing walls of the housing if emphasis is being placed not so much on the modification of the shape of the housing but rather on changing the colour or the type of material of the housing. However, the external wall elements can of course have different shapes which can also deviate from one another to a greater degree provided it is ensured that after the respective external wall elements have been connected to the housing the respective openings in the fitted-on external wall element and in the housing wall in question are aligned with one another.

According to a very advantageous development of the invention, the external wall element can be of, for example, shell-shaped design so that it can be fitted for example with one edge on to a base which projects outwards beyond the side walls of the housing.

Any desired attachment means can be used to attach the external wall element to the housing of the electronic device, but attachment means with press-on/catch closure can preferably be used. They ensure a secure connection between the external wall element and the housing and, moreover, can be easily used without a special tool being required for them.

BRIEF DESCRIPTION OF THE DRAWINGS

The invention is explained in detail below with reference to the drawing, in which:

FIG. 2 shows the cordless or mobile phone according to FIG. 1 with the external wall element fitted on;

DETAILED DESCRIPTION OF THE INVENTION

The invention is explained below with reference to a cordless telephone or mobile phone which serves as an example of an electronic device. However, the invention can also be used in other electronic devices, for example in wire-connected telephones, in pocket calculators, in television sets, in radio receivers, in CD players, In cassette recorders etc.

Figure 1:
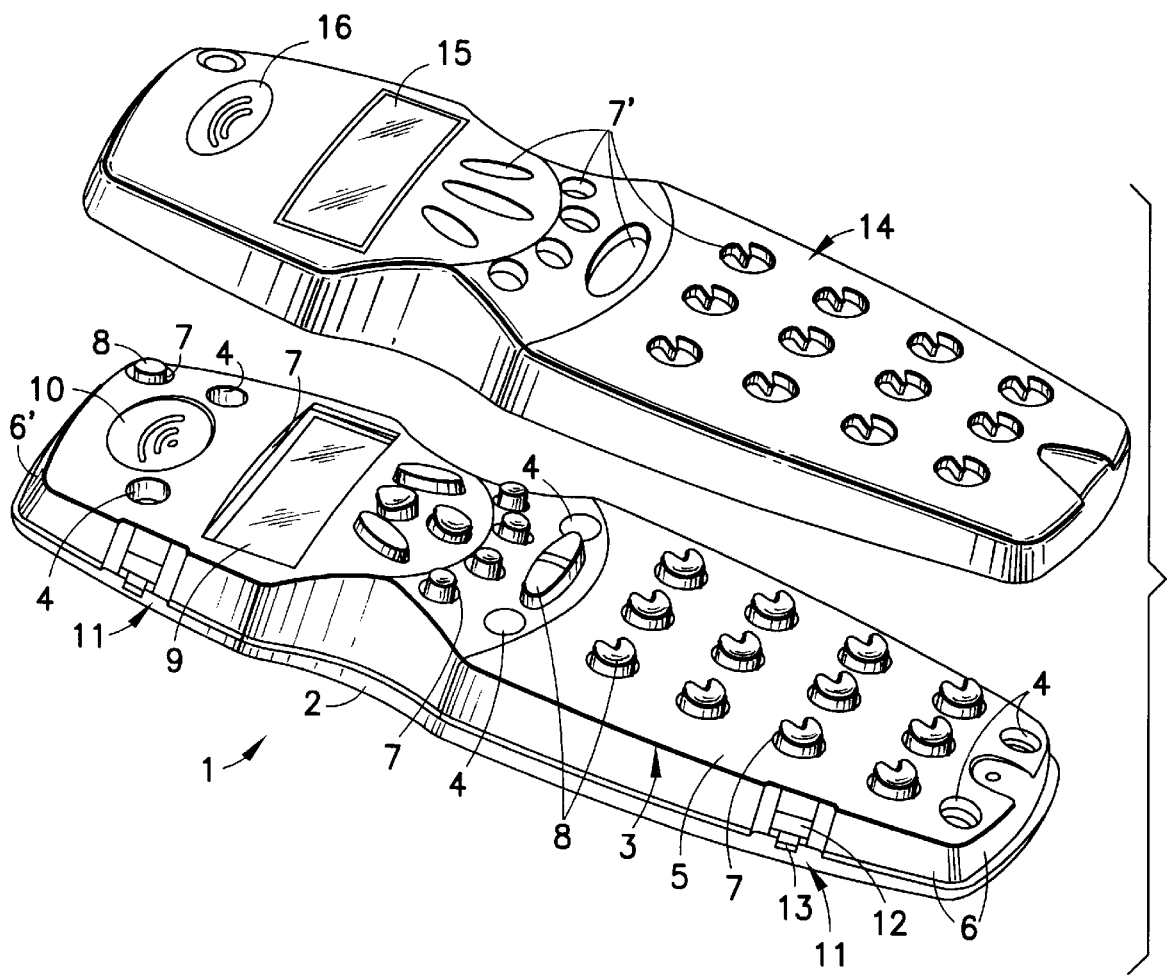
FIG. 1 shows a cordless telephone or mobile phone with external wall element removed.

In accordance with FIG. 1, a cordless telephone or mobile phone according to the invention has a housing 1 with which a plate-shaped base element 2 and a shell-shaped housing element 3 are associated. The plate-shaped based element 2 and the shell-shaped housing element 3 are connected to one another using screws (not illustrated) which project through openings 4 in the shell-shaped housing element 3 and are screwed into sockets (not illustrated) which are fixedly connected to the inside of the plate-shaped base element 2. Inside the housing 1 there is a carrier plate, attached in a suitable way, for electronic components etc.

The shell-shaped housing element 3 has a housing wall 5 which is located essentially parallel with the plate-shaped base element 2 and at a distance therefrom and is integrally connected to side walls 6 which are supported with their free or lower edge on the plate-shaped base element 2. In this arrangement, the plate-shaped base element 2 projects outwards beyond the side walls 6 by constant distance in Its edge region so that a profile with an identical contour is obtained.

In the housing wall 5 there is a plurality of through-openings 7 for electronic components which are mounted on the carrier plate, already mentioned, inside the housing 1, and partially project through the through-openings 7. The through-openings 7 can be provided for example for push-button keys 8, for a display device 9 or for a loudspeaker device/microphone device 10. A corresponding through-opening 7 may also be present in the upper side wall 6 for an aerial.

On the side walls 6, extending in the longitudinal direction of the housing 1, of the shell-shaped housing element 3 there are also in each case two attachment means 11 which are designed as press-on/catch closures at a distance from one another. They are located in each case at the front and rear ends of the telephone. The attachment means 11 have a catch projection 12 which is prestressed outwards in a sprung fashion and can be pressed inwards into the housing 1 counter to the outwardly acting spring force by means of an externally accessible activation element 13. These attachment means serve to attach to the housing 1 an external wall element 14 which is fitted on to the shell-shaped housing element 3 and is also of shell-shaped design.

Figure 3:
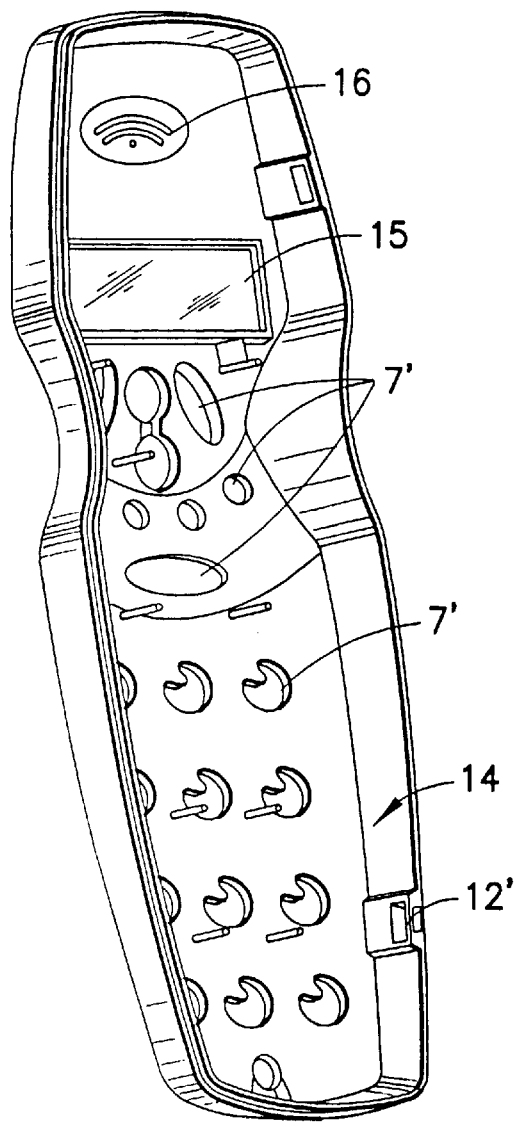
FIG. 3 shows the external wall element from the underside.

The shell-shaped external wall element 14 which is illustrated in FIGS. 1 and 3 has approximately the same contour as the shell-shaped housing element 3 but is designed in such a way that it can receive the shell-shaped housing element 3 in it. If the external wall element 14, which is designed as a thin-walled shell, is fitted on to the shell-shaped housing element 3, the shell-shaped external wall element 14 is supported with the free or downwardly pointing edge of its side walls on that part of the plate-shaped base element 2 which projects outwards beyond the shell-shaped housing element 3. Here, the wall thickness of the side walls of the shell-shaped external wall element 14 corresponds to the distance by which the edge of the plate-shaped base element 2 projects outwards beyond the side walls 6, 6' of the shell-shaped housing element 3. As a result, no step remains in the connection area between the shell-shaped external wall element 14 and the plate-shaped base element 2. The height of the side walls of the shell-shaped external wall element 14 can be selected here such that the main face of the external wall element 14 comes to rest at a short distance from the housing wall 5 and as a result does not exert any pressure on the latter.

Likewise, openings 7' which are aligned with the openings 7 in the housing wall 5 of the shell-shaped housing element 3 are provided in the main face of the external wall element 14. Therefore, it is possible to continue to operate the telephone even when the external wall element 14 is fitted on to the shell-shaped housing element 3. At the same time, the push-button keys 8 can be of such a height that they also project outwards beyond the external wall element 14. Openings which are present in the external wall element 14 for the display device 9 and the loudspeaker device/microphone device 10 can be covered, for example by means of a transparent element 15 or a grill 16.

Figure 2:
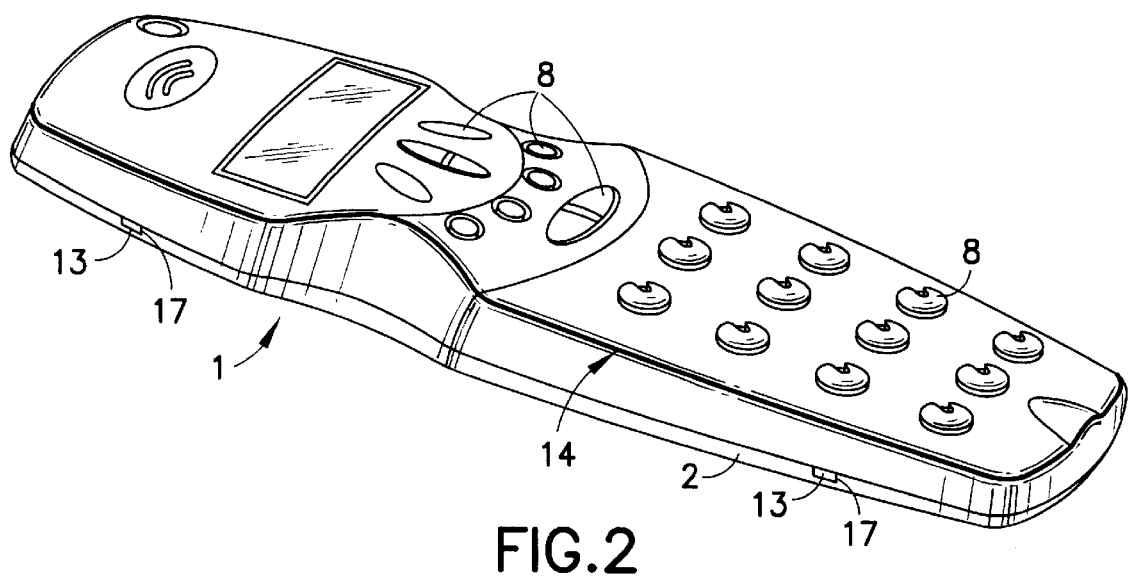
Figure 4:
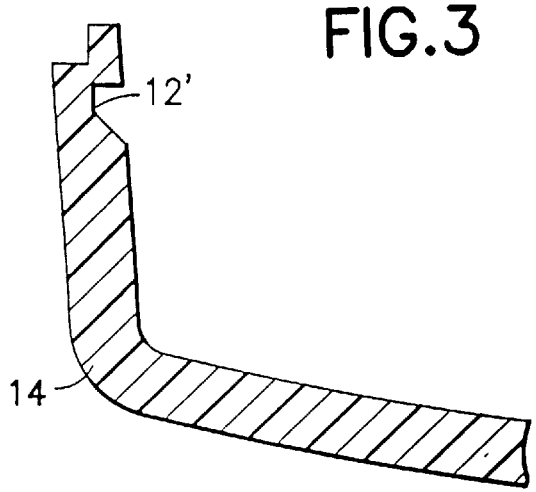
FIG. 4 shows a section through the wall of the external wall element.

FIG. 2 shows the cordless telephone or mobile phone in a state in which the shell-shaped external wall element 14 is fitted on to the shell-shaped housing element 3 and is detachably connected to the housing 1. On the internal faces of the long side walls of the external wall element 14 there are notches 12', one of which is seen in section in FIG. 4, for the catch projections 12 of the attachment means 11 so that the catch projections 12 engage in the notches 12' as a result of the outwardly pressing spring force, and thus hold the external wall element on the housing 1. In this state, the activation elements 13 are also pushed outwards but only to such an extent that they do not project beyond the side edge of the plate-shaped base element 2 or of the external wall element 14. The activation elements 13 can extend here in a groove 17 in the upper face of the plate-shaped base element 2. If the activation elements 13 are pressed inwards, that is to say inwards along the groove 17, for example using a pointed object, they move the catch projections 12 correspondingly inwards along with them so that the said catch projections 12 disengage from the notches 12' on the inside of the side walls 6 of the external wall element 14. The external wall element 14 can then be removed from the housing 1.

The external wall element 14 Is fitted on to the housing 1 by simply pressing it on. The catch projections 12 then engage automatically in the notches 12'.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled In the art that various modifications may be made within the scope of the invention.

What is claimed is:

1. A user attachable/detachable replacement external non-planar cover for replacing a user detachable external non-planar cover of a hand-held communications device and thereby modifying the external appearance of the hand-held communications device comprising:
    a main face, having an upper surface which is exposed when the cover is attached to the hand-held device;
    a side wall joining the main face at its edge and extending downwards, away from the upper surface of the main face whereby the main face and at least portions of the side wall define a cavity, the main face having a plurality of apertures therethrough to the cavity wherein the side wall provides at least one press-on catch closure element for forming a user releasable press-on catch closure with a hand-held communications device having had its user detachable cover previously removed, the press-on catch closure element providing for the attachment and detachment of the cover by a user; and
    wherein the downwardly pointing side wall has an edge which is arranged to support the cover on step-like portions of the hand-held communications device and the side wall at the edge has a thickness corresponding to the step size of the step-like portions, such that when the cover is attached to the hand-held communications device, substantially no step remains in the connection area between the cover and the device.

2. A user attachable/detachable replacement cover as claimed in claim 1, wherein the at least one press-on catch closure element is recessed to form said press-on catch closure with a hand-held communications device having had its user detachable cover previously removed.

3. A user attachable/detachable replacement cover as claimed in claim 1, wherein the at least one press-on catch closure element comprises a notch located on the interior portion of a side wall.

4. A user attachable/detachable replacement cover as claimed in claim 1, wherein the plurality of apertures includes at least one microphone aperture positioned towards a second end of the main face.

5. A user attachable/detachable replacement cover as claimed in claim 1, wherein the plurality of apertures includes a display aperture having a transparent cover element.

6. A user attachable/detachable replacement cover as claimed in claim 1, wherein the plurality of apertures include at least one key aperture of distinctive shape positioned by a display aperture.

7. A user attachable/detachable replacement cover as claimed in claim 1, wherein the downward extent of the side walls is such that the main face of the external cover does not touch or exert pressure on the hand-held communications device.

8. A user attachable/detachable replacement cover as in claim 1, wherein said cover can be attached or detached by a user without employing a tool.

* * * * *